(12) United States Patent
Naito et al.

(10) Patent No.: US 6,843,825 B2
(45) Date of Patent: Jan. 18, 2005

(54) POWDER FOR CAPACITOR, SINTERED BODY AND CAPACITOR USING THE SINTERED BODY

(75) Inventors: Kazumi Naito, Chiba (JP); Nobuyuki Nagato, Saitama (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/415,374

(22) PCT Filed: Oct. 25, 2001

(86) PCT No.: PCT/JP01/09375

§ 371 (c)(1),
(2), (4) Date: Apr. 28, 2003

(87) PCT Pub. No.: WO02/35563

PCT Pub. Date: May 2, 2002

(65) Prior Publication Data

US 2004/0042154 A1 Mar. 4, 2004

Related U.S. Application Data

(60) Provisional application No. 60/268,914, filed on Feb. 16, 2001.

(30) Foreign Application Priority Data

Oct. 26, 2000 (JP) ..................................... 2000-326737

(51) Int. Cl.⁷ .................................................. B22F 1/00
(52) U.S. Cl. ............................ 75/255; 75/245; 361/528
(58) Field of Search ..................... 75/255, 245; 361/528

(56) References Cited

U.S. PATENT DOCUMENTS 3,630,718 A * 12/1971 Neuenschwander ......... 420/425
4,954,169 A    9/1990 Behrens
5,984,997 A   11/1999 Bickmore et al.
6,051,044 A *  4/2000 Fife ............................. 75/229
6,115,235 A *  9/2000 Naito .......................... 361/303
6,521,013 B1 * 2/2003 Naito et al. ................... 75/239

FOREIGN PATENT DOCUMENTS

EP     0 825 626 A   2/1998

OTHER PUBLICATIONS

Internationals Search Report for PCT/JP01/09375 dated Nov. 11, 2002.

* cited by examiner

Primary Examiner—Ngoclan T. Mai
(74) Attorney, Agent, or Firm—Sughrue Mion, PLLC

(57) ABSTRACT

A niobium primary powder having an average particle size of 0.01 to 0.5 μm and an average circular degree of 0.8 or more, the circular degree being defined by $4\pi A/L^2$ (wherein A is an area of a solid projected on a plain face and L is an outer circumferential length of the projection view); a niobium primary agglomerated powder having an average particle size of 0.03 to 20 μm, which is an agglomerate of the niobium primary powder; a niobium secondary agglomerated powder having an average particle size of 50 to 150 μm, which is obtained by granulating the primary agglomerated powder; a sintered body of the niobium primary agglomerated powder or niobium secondary agglomerated powder; and a capacitor using the sintered body. By using sintered bodies of the niobium primary agglomerated powder or niobium secondary agglomerated powder, a capacitor having a large capacitance per unit volume and good voltage resistance can be manufactured.

17 Claims, No Drawings

US 6,843,825 B2

POWDER FOR CAPACITOR, SINTERED BODY AND CAPACITOR USING THE SINTERED BODY

CROSS-REFERENCE TO RELATED APPLICATIONS

This application is an application based on the provisions of 35 U.S.C. Article 111(a), claiming the benefit from U.S. provisional application Ser. No. 60/268,914 filed on Feb. 16, 2001, under the provisions of 35 U.S.C. 111(b), pursuant to 35 U.S.C. Article 119(e) (1).

TECHNICAL FIELD

The present invention relates to a niobium powder and a niobium sintered body, which can provide a capacitor having good voltage resistance characteristics and a large capacitance per unit volume, and also relates to a capacitor using the sintered body.

BACKGROUND ART

Capacitors for use in electronic instruments such as portable telephone and personal computer are demanded to have a small size and a large capacitance. Among these capacitors, a tantalum capacitor is preferred because of its large capacitance for the size and good performance. In this tantalum capacitor, a sintered body of tantalum powder is generally used for the anode moiety. In order to increase the capacitance of the tantalum capacitor, it is necessary to increase the weight of the sintered body or to use a sintered body increased in the surface area by pulverizing the tantalum powder.

The former method of increasing the weight of the sintered body necessarily involves enlargement of the capacitor shape and cannot satisfy the requirement for downsizing. On the other hand, in the latter method of pulverizing tantalum powder to increase the surface area, the pore size of the tantalum sintered body decreases or closed pores increase at the stage of sintering and therefore, impregnation of the cathode agent in the later process becomes difficult.

As one of means for solving these problems, a capacitor using a sintered body of powder of materials having a dielectric constant larger than that of tantalum is being studied. Niobium is known as a material having such a large dielectric constant.

The capacitor (niobium capacitor) manufactured using a niobium powder as a raw material is considered, however, inferior in the voltage resistance characteristics to capacitors manufactured using a tantalum powder as a raw material. Furthermore, when the average particle size of niobium powder as a raw material of niobium capacitors is reduced so as to increase the capacitance, a cathode agent cannot be easily impregnated in the later process, similarly to the case of tantalum powder.

With respect to metals such as niobium, JP-A-6-25701 (U.S. Pat. No. 5,407,458) (the term "JP-A" as used herein means an "unexamined published Japanese patent application") discloses a fine metal powder having a particle size of 1.0 nm to 3 μm, however, this patent publication is silent on the shape (circular degree) of the fine powder, the agglomerated powder of the fine powder and the sintered body for capacitors using the powder.

DISCLOSURE OF THE INVENTION

As a result of extensive investigations to solve the above-described problems, the present inventors have found that a niobium capacitor using a sintered body of agglomerated powder of niobium particles (primary powder) having a specific particle size exhibits good voltage resistance characteristics and is increased in the capacitance per unit volume, in particular, when the niobium particle used as a starting material of the sintered body is a primary powder having a high circular degree or a secondary agglomerated powder obtained by re-granulating the niobium primary powder, the effects are more enhanced. The present invention has been accomplished based on this finding.

More specifically, the present invention provides a powder for capacitors, having the following construction, a sintered body thereof and a capacitor using the sintered body.

1. A niobium primary powder for capacitors, having an average circular degree of 0.8 or more and an average particle size of 0.01 to 0.5 μm, the circular degree being defined by the following formula:

$$\text{Circular degree} = 4\pi A/L^2$$

(wherein A is an area of a solid projected on a flat surface and L is the outer circumferential length of the projection view).

2. The niobium primary powder for capacitors as described in 1 above, wherein at least a part of niobium is nitrided.

3. A niobium primary agglomerated powder for capacitors, having an average primary particle size of 0.01 to 0.5 μm and an average particle size of 0.03 to 20 μm.

4. The niobium primary agglomerated powder for capacitors as described in 3 above, wherein the primary particles have an average circular degree of 0.8 or more, the circular degree being defined by the following formula:

$$\text{Circular degree} = 4\pi A/L^2$$

(wherein the symbols have the same meanings as in 1 above)

5. The niobium primary agglomerated powder for capacitors as described in 3 or 4 above, wherein at least a part of niobium is nitrided.

6. The niobium primary agglomerated powder for capacitors as described in 3 or 4 above, wherein the specific surface area is from 4 to 30 $m^2/g$.

7. A niobium secondary agglomerated powder for capacitors, obtained by granulating the niobium primary agglomerated powder described in any one of 3 to 6 above.

8. The niobium secondary agglomerated powder for capacitors as described in 7 above, wherein the specific surface area is from 3 to 20 $m^2/g$.

9. The niobium secondary agglomerated powder for capacitors as described in 7 or 8 above, wherein the average particle size is from 50 to 150 μm.

10. The niobium secondary agglomerated powder for capacitors as described in any one of 7 to 9 above, wherein at least a part of niobium is nitrided.

11. A sintered body using the niobium primary agglomerated powder for capacitors described in any one of 3 to 6 above.

12. A sintered body using the niobium secondary agglomerated powder for capacitors described in any one of 7 to 10 above.

13. The sintered body as described in 11 or 12 above, wherein the specific surface area is from 1 to 10 $m^2/g$.

14. A capacitor comprising the sintered body described in 11 or 12 above as one part electrode, a dielectric material formed on the surface of the sintered body, and another part electrode provided on the dielectric material.

15. The capacitor as described in 14 above, wherein the dielectric material mainly comprises niobium oxide.

16. The capacitor as described in 15 above, wherein the niobium oxide is formed by electrolytic oxidation.

17. The capacitor as described in any one of 14 to 16 above, wherein the another part electrode is at least one material (compound) selected from the group consisting of an electrolytic solution, an organic semiconductor and an inorganic semiconductor.

18. The capacitor as described in 17 above, wherein the another part electrode is composed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing two or more repeating units represented by the following formula (1) or (2):

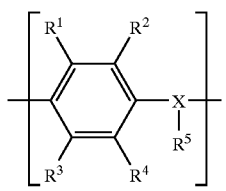

(1)

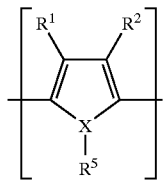

(2)

wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs $R^1$ and $R^2$, and $R^3$ and $R^4$ may combine with each other to form a ring.

19. The capacitor as described in 18 above, wherein the organic semiconductor is at least one member selected from polypyrrole, polythiophene polyaniline and substitution derivatives thereof.

EMBODIMENT OF THE INVENTION

The niobium powder as the starting material of the sintered body for niobium capacitors according to the present invention includes three kinds of niobium powders, namely, a niobium primary powder specified in the shape (circular degree) of primary particle, a granulated powder resulting from granulating the niobium primary powder to an appropriate size (hereinafter simply referred to as "primary agglomerated powder") and a granulated powder resulting from re-granulating the primary agglomerated powder to an appropriate size (hereinafter simply referred to as "secondary agglomerated powder").

[Niobium Primary Powder]

The niobium primary powder of the present invention has an average particle size of 0.01 to 0.5 $\mu$m, preferably from 0.05 to 0.5 $\mu$m. If the average particle size is less than 0.01 $\mu$m, even with the agglomerated powder structure of the present invention, the cathode agent cannot be easily impregnated in the later process, whereas if it exceeds 0.5 $\mu$m, a small-size and large-capacitance capacitor can be hardly obtained.

When a capacitor is manufactured using a sintered body of a primary agglomerated powder comprising this primary powder, particularly powder particles having an average circular degree of 0.8 or more, preferably 0.84 or more, the obtained capacitor can have excellent voltage resistance characteristics. If the average circular degree is less than the above-described range, the capacitor obtained by using the primary agglomerated powder resulting from granulating the primary powder may be sometimes insufficiently improved in the voltage resistance characteristics.

However, even if the primary powder has an average circular degree of less than 0.8, when the primary agglomerated powder of this primary powder is further granulated to prepare a secondary agglomerated powder and a capacitor is manufactured using a sintered body obtained by sintering the secondary agglomerated powder, the capacitor can also have excellent voltage resistance characteristics.

In the present invention, the average circular degree is an average value of the circular degree defined by the following formula and this is used as an index for showing the shape of powder particle of the primary powder.

Circular degree=4 $\pi A/L^2$ (wherein A is an area ($\mu m^2$) of a solid projected on a flat surface and L is an outer circumferential length of the projection view).

In practice, the circular degree can be determined as follows. A picture of powder particles is taken by a scanning electron microscope (SEM) and in recognition of this SEM photograph as a projection view of the powder particles, the area and the circumferential length of individual particles are measured on the picture. In order to determine the average circular degree with good precision, 100 or more, preferably 1,000 or more particles are measured on the circular degree and from the values obtained, an average value is calculated. For example, when an enlarged SEM photograph of powder particles is taken at a magnification of about 2,000 times and individual particles are determined on the area and the circumferential length by a computer processing, even particles having a complicated outer circumferential shape can be counted and therefore, the determined average circular degree is reliable. According to the above-described formula, the circular degree of a completely spherical particle is 1 and the circular degree of a cubic particle is 0.78. As the average circular degree is closer to 1, the shape of the powder particle is closer to a sphere.

Examples of the method for producing a primary powder having an average particle size of 0.01 to 0.5 $\mu$m and an average circular degree of 0.8 or more include a method of pulverizing a hydrogenated niobium powder in a jet mill. By controlling the residence time of niobium powder in the jet mill, the average circular degree can be set to a predetermined preferable value. The hydrogenated niobium powder is a niobium powder obtained by allowing a hydrogen gas to be absorbed into a niobium powder (having an average particle size of 0.5 to tens of $\mu$m) produced using a known method. The niobium powder is dehydrogenated after the pulverization in the jet mill or after forming a primary agglomerated powder which is described later, whereby the objective primary powder can be obtained.

At least a part of the niobium primary powder is preferably nitrided. The nitrided amount is from tens of ppm by mass to tens of thousands of ppm by mass. By this partial nitridation, the capacitor manufactured can be improved in the leakage current (LC) characteristics. In practice, the LC value is measured in an aqueous phosphoric acid solution after manufacturing a sintered body from the primary powder and forming a dielectric material on the surface of the sintered body as described later. At this time, in order to reduce the LC value, the nitrided amount is preferably from 300 to 7,000 ppm by mass. The "nitrided amount" as used herein excludes the nitrogen adsorbed to niobium powder.

The nitridation of the niobium powder can be performed by liquid nitridation, ion nitridation, gas nitridation or a combination thereof. Among these, gas nitridation is preferred because the apparatus therefor is simple and the operation is easy.

The gas nitridation can be performed by allowing the niobium powder to stand in a nitrogen gas atmosphere. With a temperature of 2,000° C. in the nitridation atmosphere and a standing time of several hours or less, a niobium powder having an objective nitrided amount can be obtained. The treatment time can be shortened by performing the treatment at a high temperature. The amount of niobium powder nitrided can be controlled by the conditions confirmed in a preliminary test or the like on the nitridation temperature and nitridation time of the material to be nitrided.

The nitridation can be performed after the production of the primary powder or after the production of a primary agglomerated powder or a secondary agglomerated powder, which are described later. The nitridation may be performed only once after the production of each powder or may be performed two or more times every each production of the powder. For example, after a primary agglomerated powder is produced and partially nitrided and a secondary agglomerated powder is obtained therefrom, the secondary agglomerated powder may be re-nitrided (re-nitridation). At the time of producing the agglomerated powder, the powder particle is deformed and the inside free of nitridation comes out to the surface in some cases but by performing the re-nitridation, the surface of the agglomerated powder can be advantageously nitrided without fail.

[Primary Agglomerated Powder]

In the present invention, a niobium primary agglomerated powder resulting from agglomeration of several to tens of primary powder particles is used as a starting material of the sintered body for capacitors.

The primary agglomerated powder can be prepared by allowing the above-described primary powder to stand in an atmosphere at an appropriate temperature, by cracking the powder after the standing or by further classifying the powder after the cracking. The primary agglomerated powder can be produced to have any average particle size, however, a primary agglomerated powder having an average particle size of 0.03 to 20 µm is usually used. In the case where the primary powder is obtained by the above-described jet mill method, the primary powder needs not be taken out from the jet mill vessel to the outside and the primary agglomerated powder can be produced in the jet mill vessel or another vessel connected with the jet mill, so that excess oxidation can be advantageously prevented.

The niobium primary agglomerated powder for capacitors having an average circular degree of 0.8 or more, an average primary particle size of 0.01 to 0.5 µm and an average particle size of 0.03 to 20 µm can also be produced directly without using the above-described primary particle. Examples of the direct production method include hydrogen reduction of niobium halide. A so-called continuous method of halogenating niobium metal and further continuously hydrogen-reducing the halogenated niobium metal may also be used.

One example of the latter continuous method is described below. A niobium metal having an appropriate particle size of, for example, 0.1 to 5 mm is filled in the first reaction tower, a halogenation gas or a halogenation gas diluted with an inert gas such as argon or nitrogen is passed therethrough, and the reaction is performed at a temperature of 200 to 800° C., preferably from 300 to 500° C. to obtain niobium halide in the gas state. Without isolating the obtained niobium halide or depending on the case, after adding an inert gas to dilute the obtained niobium halide, the niobium halide is introduced into the second reaction tower and mixed with a hydrogen gas and the reduction is performed at a temperature of from 800 to 2,000° C., preferably from 1,000 to 1,800° C., to produce a niobium metal fine powder. The gas containing the produced niobium metal fine powder is introduced into a collection tank for niobium primary agglomerated powder and cooled. The niobium powder may also be collected and separated from the gas using an appropriate filter or may be collected by a scrubber. At this time, if cooling in the process of reaching the collection tank and in the collection tank is rapidly performed, a niobium primary agglomerated powder is not generated and a primary powder disadvantageously results. The reduction of niobium halide with a hydrogen gas may be performed after separating an unreacted halogen gas or an inert gas. Or, the niobium powder collected and separated from the gas may be again contacted with a hydrogen gas to repeat the reduction reaction. Also, the niobium halide may be collected as a solid, evaporated under heating in a separate system and reduced with a hydrogen gas. Examples of the halogenating agent used include fluorine, chlorine, bromine and hydrogen halogenide and these halogenating agents may be used individually or in combination of two or more thereof. The amount of the hydrogen gas used at the reduction is preferably from 2 to 500 times in a molar ratio to the niobium halide.

The specific surface area of the niobium primary agglomerated powder obtained by the above-described two methods can be freely changed, however, a niobium primary agglomerated powder having a specific surface area of 4 to 30 $m^2/g$ is usually used.

[Secondary Agglomerated Powder]

When the primary agglomerated powder is further granulated to form a secondary agglomerated powder having an appropriate size and a capacitor is manufactured using a sintered body of the secondary agglomerated powder, the impregnation of cathode agent is facilitated, the capacitance can be more increased and the voltage resistance characteristics are improved.

In the case of manufacturing a capacitor using the secondary agglomerated powder, excellent voltage resistance characteristics are provided even if the average circular degree of the primary powder is less than 0.8.

The secondary agglomerated powder can be prepared by granulating the primary agglomerated powder according to a conventionally known method. Examples of the method include a method where powder particles are left standing at a high temperature of 500 to 2,000° C. in a vacuum and then wet or dry cracked, a method where powder particles are mixed with an appropriate binder such as acrylic resin or polyvinyl alcohol and then cracked, and a method where powder particles are mixed with an appropriate compound such as acrylic resin, camphor, phosphoric acid or boric acid, left standing at a high temperature in a vacuum and then wet or dry cracked.

The particle size of the secondary agglomerated powder can be freely controlled by the degree of granulation and cracking, however, a secondary agglomerated powder having an average particle size of 10 to 150 μm is usually used. The secondary agglomerated powder may be classified after the granulation and cracking. After the granulation, the secondary agglomerated powder may also be mixed with an appropriate amount of powder particles before the granulation or with an appropriate amount of secondary agglomerated powders having a plurality of average particle sizes. The specific surface area of the thus-produced secondary agglomerated powder can be freely adjusted, however, a secondary agglomerated powder having a specific surface area of 3 to 20 m²/g is usually used.

[Sintered Body]

The niobium sintered body of the present invention is produced by sintering the above-described niobium primary agglomerated powder or secondary agglomerated powder. The production method of the sintered body is not particularly limited but, for example, the niobium primary agglomerated powder or secondary agglomerated powder is press-molded into a predetermined shape and then heated at 500 to 2,000° C. for several minutes to several hours under a reduced pressure of $1.33 \times 10^2$ to $1.33 \times 10^{-5}$ Pa (1 to $10^{-7}$ Torr) or in an inert gas such as argon, thereby producing a sintered body.

A lead wire comprising a valve-acting metal such as niobium or tantalum may be prepared to have an appropriate shape and an appropriate length and integrally molded at the above-described press-molding of niobium powder such that a part of the lead wire is inserted into the inside of the molded article, whereby the lead wire can be designed to work out to a leading line of the sintered body.

The specific surface area of the thus-produced niobium sintered body of the present invention can be freely adjusted, however, a niobium sintered body having a specific surface area of from 1 to 10 m²/g is usually used.

[Capacitor]

The capacitor of the present invention comprises the above-described sintered body as one part electrode, a dielectric material formed on the surface of the sintered body, and another part electrode provided on the dielectric material.

Examples of the dielectric material for the capacitor include a dielectric material comprising tantalum oxide, niobium oxide, polymer substance or ceramic compound, with a dielectric material comprising niobium oxide being preferred. The dielectric material comprising niobium oxide can be obtained by chemically forming the niobium sintered body as one part electrode in an electrolytic solution. For chemically forming the niobium electrode in an electrolytic solution, an aqueous protonic acid solution is generally used, such as aqueous 0.1% by mass phosphoric acid solution or aqueous sulfuric acid solution. In the case of obtaining a dielectric material comprising niobium oxide by chemically forming the niobium electrode in an electrolytic solution, the capacitor of the present invention is an electrolytic capacitor and the niobium side serves as an anode.

In the capacitor of the present invention, the another part electrode is not particularly limited and for example, at least one compound selected from electrolytic solutions, organic semiconductors and inorganic semiconductors known in the art of aluminum electrolytic capacitor, can be used.

Specific examples of the electrolytic solution include a dimethylformamide-ethylene glycol mixed solution having dissolved therein 5% by mass of isobutyltripropylammonium borotetrafluoride electrolyte, and a propylene carbonate-ethylene glycol mixed solution having dissolved therein 7% by mass of tetraethylammonium borotetrafluoride.

Specific examples of the organic semiconductor include an organic semiconductor comprising a benzenepyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing a repeating unit represented by formula (1) or (2):

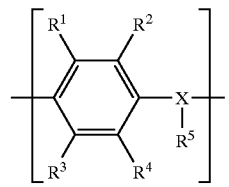

(1)

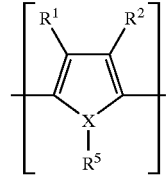

(2)

(wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs $R^1$ and $R^2$, and $R^3$ and $R^4$ may combine with each other to form a ring).

Examples of the polymer containing a repeating unit represented by formula (1) or (2) include polyaniline, polyoxyphenylene, polyphenylene sulfide, polythiophene, polyfuran, polypyrrole, polymethylpyrrole, and derivatives of these polymers.

Examples of the dopant which can be used include sulfoquinone-base dopants, anthracene monosulfonic acid-base dopants and other various anionic dopants. Also, an electron acceptor dopant such as $NO^+$ or $NO_2^+$ salt may be used.

Specific examples of the inorganic semiconductor include inorganic semiconductors mainly comprising lead dioxide or manganese dioxide, and inorganic semiconductors comprising triiron tetraoxide.

These semiconductors may be used individually or in combination of two or more thereof.

When the organic or inorganic semiconductor used has an electrical conductivity of $10^{-2}$ to $10^3$ S·cm$^{-1}$, the manufactured capacitor can have a smaller impedance value and can be more increased in the capacitance at a high frequency.

The electrical conducting layer can be formed, for example, by the solidification of an electrically conducting paste, the plating, the metallization or the formation of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more kinds of pastes, the pastes may be mixed or may be superposed one on another as separate layers. The electrically conducting paste applied is then solidified by allowing it to stand in an air or under heating. Examples of the plating include nickel plating, copper plating, silver plating and aluminum plating. Examples of the metal to be vapor-deposited include aluminum, nickel, copper and silver.

In practice, for example, aluminum paste and silver paste are stacked in this order on the another part electrode and these are molded with a material such as epoxy resin, thereby fabricating a capacitor. This capacitor may have a niobium or tantalum lead which is sintered and molded integrally with the niobium sintered body or welded afterward.

The thus-fabricated capacitor of the present invention is jacketed using, for example, resin mold, resin case, metallic jacket case, resin dipping or laminate film, and then used as a capacitor product for various uses.

In the case where the another part electrode is liquid, the capacitor fabricated from the above-described two electrodes and a dielectric material is housed, for example, in a can electrically connected to the another part electrode to complete a capacitor. In this case, the electrode side of the niobium sintered body is guided outside through the above-described niobium or tantalum lead and at the same time, insulated from the can using an insulating rubber or the like.

BEST MODE FOR CARRYING OUT THE INVENTION

The present invention is described in greater detail below by referring to the Examples and Comparative Examples.

The methods for measuring and evaluating the physical properties in each Example are described below.

(1) Nitrogen Content of Niobium Powder

This was determined using a nitrogen and oxygen analyzer manufactured by LEKO.

(2) Average Particle Size of Agglomerated Powder

This was measured using "Microtrack" (manufactured by Microtrack).

(3) Specific Surface Area of Agglomerated Powder

This was measured according to BET method.

(4) Voltage Resistance Value of Capacitor

This was designated as a voltage value when a voltage was applied to 30 units of capacitors in each Example while elevating in sequence by 1 V and the number of short-circuited capacitors exceeded 5.

EXAMPLES 1 TO 3 AND COMPARATIVE EXAMPLES 1 AND 2

A niobium powder (average particle size: 0.9 $\mu$m) obtained by introducing a hydrogen gas into a niobium ingot and wet-cracking the ingot was pulverized in a jet mill in a nitrogen atmosphere without passing through dehydrogenation. The pulverized niobium powder was not taken out but left standing at 400° C. under reduced pressure, thereby performing the dehydrogenation. The dehydrogenated niobium powder was further left standing at 850° C. and then cracked to produce a niobium primary agglomerated powder. The values of the thus-produced primary agglomerated powder are shown in Table 1. The average circular degree was adjusted by varying the residence time in the jet mill.

Subsequently, a nitrogen gas was passed therethrough at 300° C. for 20 minutes to obtain a partially nitrided primary agglomerated powder having a nitrided amount of about 1,600 ppm.

The obtained primary agglomerated powder was molded to a size of 1.8×3.5×4.5 mm (a niobium wire having a diameter of 0.3 mm was integrally molded to work out to a lead) and then sintered at 1,250° C. in a vacuum of 6.7×10$^{-3}$ Pa (5×10$^{-5}$ Torr) to obtain a sintered body. This sintered body was electrochemically formed in an aqueous 0.1% by mass phosphoric acid solution at a temperature of 80° C. and 20 V to form a dielectric layer comprising niobium oxide. Thereafter, polypyrrole (using ammonium persulfate as an oxidant and sodium anthraquinonesulfate as a dopant, the reaction between pyrrole and oxidant was repeated to effect polymerization in the presence of the dopant) as another part electrode material was filled in pores inside the sintered body. Furthermore, carbon paste and silver paste were stacked in this order on the another part electrode and after mounting on a lead frame, the whole was molded with an epoxy resin to manufacture a capacitor. The specific surface area of the sintered body in each Example, and the capacitance and the voltage resistance of the manufactured capacitor are shown in Table 2.

TABLE 1

|  | Average Circular Degree | Average Particle Size of Primary Powder, $\mu$m | Average Particle Size of Primary Agglomerated Powder, $\mu$m | Specific Surface Area, m$^2$/g |
|---|---|---|---|---|
| Example 1 | 0.89 | 0.3 | 14 | 9 |
| Example 2 | 0.84 | 0.3 | 10 | 10 |
| Example 3 | 0.80 | 0.4 | 9 | 7 |
| Comparative Example 1 | 0.77 | 0.4 | 9 | 7 |
| Comparative Example 2 | 0.75 | 0.4 | 9 | 7 |

TABLE 2

|  | Specific Surface Area of Sintered Body (m$^2$/g) | Capacitance ($\mu$F) | Volume Resistance (V) |
|---|---|---|---|
| Example 1 | 3.0 | 1100 | 13 |
| Example 2 | 3.2 | 1270 | 12 |
| Example 3 | 2.6 | 940 | 13 |
| Comparative Example 1 | 2.6 | 640 | 8 |
| Comparative Example 2 | 2.6 | 570 | 8 |

As is apparent from Tables 1 and 2, when a primary agglomerated powder comprising primary powder having an average circular degree of 0.8 or more is used, the capacitor is improved in the capacitance and the voltage resistance characteristics as compared with the case using a powder having an average circular degree of less than 0.8 (Examples 1 to 3 and Comparative Examples 1 and 2). In particular, on comparison of the results between Example 3 and Comparative Example 1 where only the average circular degree value of the primary powder is different and other conditions are the same, it is seen that excellent characteristics can be obtained by using a primary powder having a high average circular degree.

EXAMPLE 4

A high-purity niobium metal having a particle size of about 5 mm was filled in the first reaction tower and heated at 400° C. Thereafter, a dry chlorine gas diluted with argon gas to 50% by volume was passed through that metal niobium layer and reacted. The resulting reaction gas was introduced into the second reaction tower designed such that the reaction gas blows out through a capillary, and from the periphery thereof, hydrogen gas was fed in a molar amount of 20 times the reaction gas (NbCl$_x$) and reacted at 1,200° C. The reaction product was introduced into the recovery tower for niobium primary agglomerated powder and after separating gases such as hydrogen chloride, brought into contact with hydrogen, followed by water washing and drying. Subsequently, a very slight amount of air diluted with nitrogen was repeatedly contacted with the powder, as a result, a primary agglomerated powder having no excess oxide film on the surface thereof and having an average particle size of 0.3 μm was obtained. This primary agglomerated powder was an agglomerate of several to ten primary powder particles having an average circular degree of 0.94 and the specific surface area thereof was about 21 m$^2$/g.

The obtained primary agglomerated powder was left standing at 780° C. under reduced pressure of 6.7×10$^{-4}$ Pa (5×10$^{-6}$ Torr) and then cracked to obtain a secondary agglomerated powder having an average particle size of 85 μm and a specific surface area of 13 m$^2$/g. Subsequently, this secondary agglomerated powder was left standing at 300° C. for two hours in a nitrogen gas stream to obtain a partially nitrided secondary agglomerated powder having a nitrided amount of 1,200 ppm.

Using this secondary agglomerated powder, a molded article and then a sintered body were obtained in the same manner as in Example 1 except for changing the sintering temperature to 1,150° C. The specific surface area of the sintered body was 6.8 m$^2$/g.

In the same manner as in Example 1, a niobium oxide dielectric layer was formed on the surface of the sintered body. Then, using a mixed solution of an aqueous 30% lead acetate solution and an aqueous 35% ammonium persulfate solution, an inorganic semiconductor layer comprising lead dioxide and lead sulfate (lead dioxide: 95% by mass) was formed as another part electrode layer on the dielectric layer. Thereafter, in the same manner as in Example 1, a carbon layer and a silver paste layer were stacked in this order on the another part electrode layer and after mounting on a lead frame, the whole was molded with an epoxy resin to manufacture a capacitor.

EXAMPLES 5 AND 6

The primary agglomerated powders produced in the same manner as in Example 3 and Comparative Example 1 each was left standing at 950° C. under reduced pressure of 6.7×10$^{-3}$ Pa (5×10$^{-5}$ Torr) to obtain a secondary agglomerated powder (the secondary agglomerated powder from Example 3 was Example 5 and the secondary agglomerated powder from Comparative Example 1 was Example 6). Each secondary agglomerated powder was classified to obtain secondary agglomerated powders having an average particle size of 120 μm and a specific surface area of 6.2 m$^2$/g. Subsequently, molded articles were manufactured in the same manner as in Example 1 and then sintered to obtain sintered bodies. These sintered bodies both had a specific surface area of 2.2 m$^2$/g. Thereafter, in the same manner as in Example 1, a niobium oxide dielectric layer, another part electrode layer comprising polypyrrole, a carbon layer and a silver paste layer were formed in this order and the whole was molded with an epoxy resin to manufacture capacitors.

The capacitance and the voltage resistance value of each capacitor manufactured in Examples 4 to 6 are shown in Table 3.

TABLE 3

|  | Volume (μF) | Voltage Resistance (V) |
|---|---|---|
| Example 4 | 2160 | 13 |
| Example 5 | 970 | 12 |
| Example 6 | 1000 | 12 |

It is seen from Tables 1, 2 and 3 that the capacitors using a secondary agglomerated powder (Examples 5 and 6) have a larger capacitance and a higher voltage resistance than the capacitors using a primary agglomerated powder (Example 3 and Comparative Example 1), that even in the case of using a primary powder having an average circular degree of less than 0.8, an excellent effect can be obtained by forming it into a secondary agglomerated powder, and that when a secondary agglomerated powder granulated from a primary powder having a high circular degree (circular degree: 0.94) through a primary agglomerated powder by a continuous method is used, the obtained capacitor can have a large capacitance and good voltage resistance characteristics (Example 4).

INDUSTRIAL APPLICABILITY OF THE INVENTION

According to the present invention, the starting material niobium powder of a sintered body for niobium capacitors is a niobium primary particle having an average particle size of 0.01 to 0.5 μm and being specified that the circular degree of primary particles is 0.8 or more, a primary agglomerated powder obtained by granulating the niobium primary powder, or a secondary agglomerated powder obtained by further granulating the primary agglomerated powder. By sintering this starting material niobium powder and using the obtained sintered body, a capacitor having a large capacitance per unit volume and good voltage resistance characteristics can be manufactured.

In the case where a fine metal powder is used as it is and formed into a sintered body, the pore size of the sintered body decreases or closed pores increases at the stage of sintering and therefore, the cathode agent cannot be satisfactorily impregnated. However, according to the present invention, a fine niobium primary powder for capacitors having an average particle size of 0.01 to 0.5 μm is granulated to an appropriate size to produce a primary agglomerated powder, or the produced primary agglomerated powder is again granulated to produce a secondary agglomerated powder, whereby, it is considered, pores having different sizes are disposed inside the sintered body, as a result, the impregnation of the cathode agent can be facilitated, the impregnation rate can be increased and the capacitance per unit volume can be increased.

Furthermore, although the voltage resistance characteristics of a capacitor is considered to depend on the mechanical concentrated stress and the electric current stress generated at the edge part of a raw material powder particle and also on the above-described impregnation rate of the cathode agent, the shape of the raw material niobium powder particle of the present invention is approximated to a sphere and the edge part of the powder particle is reduced, whereby, it is considered, the voltage resistance characteristics of the capacitor are improved.

What is claimed is:

1. A niobium primary powder for capacitors, having an average circular degree of 0.8 or more and an average particle size of 0.01 to 0.5 μm, the circular degree being defined by the following formula:

Circular degree=$4\pi A/L^2$ wherein A is an area of a solid projected on a flat surface and L is the outer circumferential length of the projection view, and at least a part of the niobium is nitrided.

2. A niobium primary agglomerated powder for capacitors, having an average primary particle size of 0.01 to 0.5 μm and an average particle size of 0.03 to 20 μm, wherein the primary particles have an average circular degree of 0.8 or more, the circular degree being defined by the following formula:

Circular degree=$4\pi A/L^2$ wherein A is an area of a solid projected on a flat surface and L is the outer circumferential length of the projection view.

3. The niobium primary agglomerated powder for capacitors as claimed in claim 2, wherein at least a part of niobium is nitrided.

4. The niobium primary agglomerated power for capacitors as claimed in claim 2, wherein the specific surface area is from 4 to 30 m²/g.

5. A niobium secondary agglomerated powder for capacitors, obtained by granulating the niobium primary agglomerated powder claimed in claim 2.

6. The niobium secondary agglomerated powder for capacitors as claimed in claim 5, wherein the specific surface area is from 3 to 20 m²/g.

7. The niobium secondary agglomerated powder for capacitors as claimed in claim 5, wherein the average particle size is from 50 to 150 μm.

8. The niobium secondary agglomerated powder for capacitors as claimed in claim 5, wherein at least a part of niobium is nitrided.

9. A sintered body using the niobium primary agglomerated powder for capacitors claimed in claim 2.

10. A sintered body using the niobium secondary agglomerated powder for capacitors claimed in claim 5.

11. The sintered body as claimed in claim 9, wherein the specific surface area is from 1 to 10 m²/g.

12. A capacitor comprising the sintered body as claimed in claim 9 as one part electrode, a dielectric material formed on the surface of the sintered body, and another part electrode provided on the dielectric material.

13. The capacitor as claimed in claim 12, wherein the dielectric material mainly comprises niobium oxide.

14. The capacitor as claimed in claim 13, wherein the niobium oxide is formed by electrolytic oxidation.

15. The capacitor as claimed in claim 12, wherein the another part electrode is at least one material selected from the group consisting of an electrolytic solution, an organic semiconductor and an inorganic semiconductor.

16. The capacitor as claimed in claim 15, wherein the another part electrode is composed of an organic semiconductor and the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing two or more repeating units represented by the following formula (1) or (2):

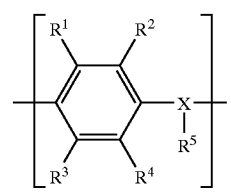

(1)

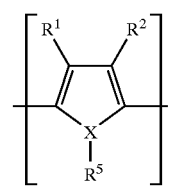

(2)

wherein $R^1$ to $R^4$, which may be the same or different, each represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs $R^1$ and $R^2$, and $R^3$ and $R^4$ may combine with each other to form a ring.

17. The capacitor as claimed in claim 16, wherein the organic semiconductor is at least one member selected from polypyrrole, polythiophene, polyaniline and substitution derivatives thereof.

* * * * *